(12) United States Patent
Inoue et al.

(10) Patent No.: US 12,194,555 B2
(45) Date of Patent: Jan. 14, 2025

(54) METHOD FOR MAKING SCREW HOLE

(71) Applicant: TMEIC Corporation, Chuo-ku (JP)

(72) Inventors: Fumihiko Inoue, Chuo-ku (JP);
Masatsugu Hirose, Kobe (JP)

(73) Assignee: TMEIC Corporation, Chuo-ku (JP)

( * ) Notice: Subject to any disclaimer, the term of this patent is extended or adjusted under 35 U.S.C. 154(b) by 204 days.

(21) Appl. No.: 17/779,668

(22) PCT Filed: Oct. 30, 2020

(86) PCT No.: PCT/JP2020/040880
§ 371 (c)(1),
(2) Date: May 25, 2022

(87) PCT Pub. No.: WO2022/091362
PCT Pub. Date: May 5, 2022

(65) Prior Publication Data
US 2022/0410296 A1    Dec. 29, 2022

(51) Int. Cl.
*B23G 1/16*    (2006.01)
*B23G 1/44*    (2006.01)
(Continued)

(52) U.S. Cl.
CPC .................. *B23G 1/44* (2013.01); *B23G 1/16* (2013.01); *B21J 15/02* (2013.01); *B23G 1/26* (2013.01);
(Continued)

(58) Field of Classification Search
CPC ......... B23G 1/16; B23G 1/26; B23P 2700/12; Y10T 29/49943
See application file for complete search history.

(56) References Cited

U.S. PATENT DOCUMENTS

| 4,270,253 A | 6/1981 | Herb et al. |
| 5,174,007 A * | 12/1992 | Fitz ........................... B23P 6/00 |
| | | 29/402.15 |

FOREIGN PATENT DOCUMENTS

| GB | 2019262 A * 10/1979 | .............. B23P 13/00 |
| JP | 55-161536 A | 12/1980 |

(Continued)

OTHER PUBLICATIONS

Written Opinion of the International Searching Authority issued Nov. 24, 2020 in PCT/JP2020/040880 (with English translation), 8 pages.

(Continued)

*Primary Examiner* — Jermie E Cozart
(74) *Attorney, Agent, or Firm* — Oblon, McClelland, Maier & Neustadt, L.L.P.

(57) ABSTRACT

A method for making a screw hole in a workpiece including a plate-shaped portion includes: preparing an auxiliary member having a flat plate shape; forming, in the plate-shaped portion, a first pilot hole having a minor diameter smaller than a major diameter of the screw hole; forming, in the auxiliary member, a second pilot hole having a minor diameter smaller than the major diameter of the screw hole; fixing the auxiliary member to the plate-shaped portion so that the first pilot hole is concentric with the second pilot hole; and making the screw hole in the plate-shaped portion and the auxiliary member by inserting a tap in the first pilot hole and the second pilot hole.

9 Claims, 6 Drawing Sheets

(51) Int. Cl.
　　　*B21J 15/02*　　　　(2006.01)
　　　*B23G 1/26*　　　　(2006.01)
(52) U.S. Cl.
　　　CPC ..... *B23P 2700/12* (2013.01); *Y10T 29/49943* (2015.01)

(56) References Cited

FOREIGN PATENT DOCUMENTS

| JP | 2004-148341 A | 5/2004 |
| JP | 2012-82890 A | 4/2012 |

OTHER PUBLICATIONS

Japanese Office Action issued Apr. 20, 2022 in Japanese Patent Application No. 2021-507864 (with English translation), 6 pages.
Combined Chinese Office Action and Search Report issued Mar. 6, 2024 in Chinese Patent Application No. 202080082655.1 (with unedited computer-generated English translation), 16 pages.
Korean Office Action issued May 2, 2024 in Korean Patent Application No. 10-2022-7017384 (with unedited computer-generated English translation), 8 pages.
Office Action dated Aug. 6, 2024, issued in counterpart CN Application No. 202080082655.1 file on Oct. 30, 2020, with English translation, (16 pages).

\* cited by examiner

METHOD FOR MAKING SCREW HOLE

TECHNICAL FIELD

The present disclosure relates to a method for making a screw hole in a plate-shaped portion of a workpiece.

BACKGROUND ART

A method generally used for making a screw hole (internal thread) in a thin plate-shaped portion of a workpiece is to form a through hole in the plate-shaped portion, and join a weld nut to the thin plate-shaped portion by welding while keeping the through hole concentric with a threaded hole of the weld nut (see for example Japanese Patent Laying-Open No. 2012-82890 (PTL 1)).

Another method for making a screw hole is to form a through hole in a thin plate-shaped portion, and crimp and attach a nut to the periphery of the thorough hole (see for example Japanese Patent Laying-Open No. 2004-148341 (PTL 2)).

CITATION LIST

Patent Literature

PTL 1: Japanese Patent Laying-Open No. 2012-82890
PTL 2: Japanese Patent Laying-Open No. 2004-148341

SUMMARY OF INVENTION

Technical Problem

A concern about the method that joins the weld nut is the requirement for an additional step of welding. In particular, for a workpiece formed of a galvanized steel plate, pore defects and/or sputter is caused during welding, resulting in a problem of degraded welding workability.

A concern about the method that crimps and attaches the nut is freewheeling of the nut at a specified torque, depending on the state of attachment of the nut. In order to prevent freewheeling of the nut, the nut is required to be welded, which is accompanied by the aforementioned concern. Moreover, if the welded part is damaged, an additional plating is required for the damaged welded part.

The present disclosure is made to solve the above-described problems, and an object of the present disclosure is to provide a method for making a screw hole that enables a screw hole to be formed in a plate-shaped portion of a workpiece by simple and easy means.

Solution to Problem

According to an aspect of the present disclosure, a method for making a screw hole in a workpiece having a plate-shaped portion includes: preparing an auxiliary member having a flat plate shape; forming, in the plate-shaped portion, a first pilot hole having a minor diameter smaller than a major diameter of the screw hole; forming, in the auxiliary member, a second pilot hole having a minor diameter smaller than the major diameter of the screw hole; fixing the auxiliary member to the plate-shaped portion so that the first pilot hole is concentric with the second pilot hole; and making the screw hole in the plate-shaped portion and the auxiliary member by inserting a tap in the first pilot hole and the second pilot hole.

Advantageous Effects of Invention

According to the present disclosure, a screw hole can be made in a plate-shaped portion of a workpiece by simple and easy means.

DESCRIPTION OF EMBODIMENTS

Figure 1:
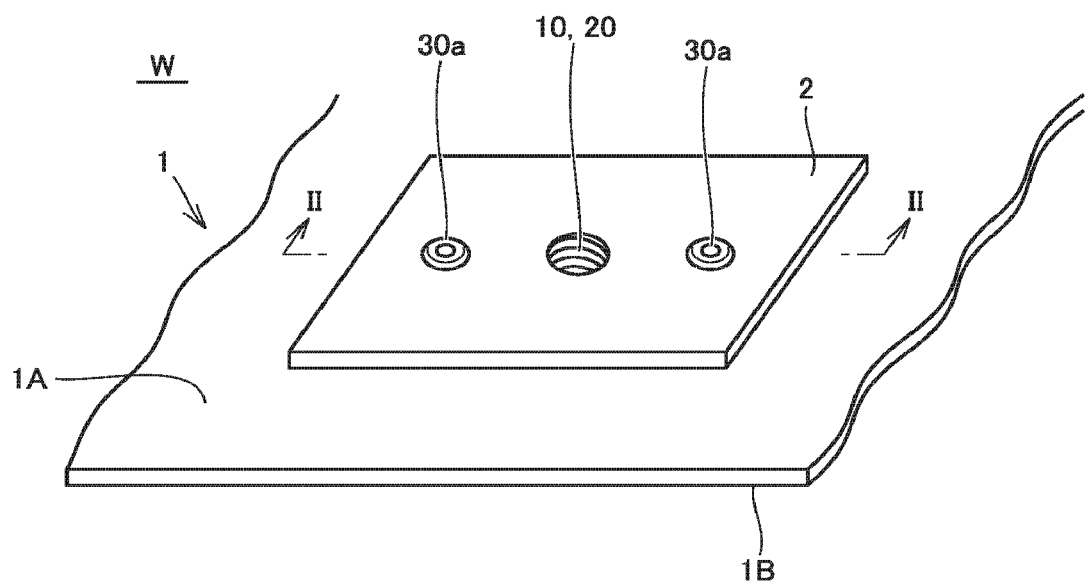
FIG. 1 is an external view of a workpiece to which a method for making a screw hole according to the present embodiment has been applied.

An embodiment of the present disclosure is described hereinafter in detail with reference to the drawings. In the following, the same or corresponding parts in the drawings are denoted by the same reference characters, and a description thereof is not repeated in principle.

Figure 2:
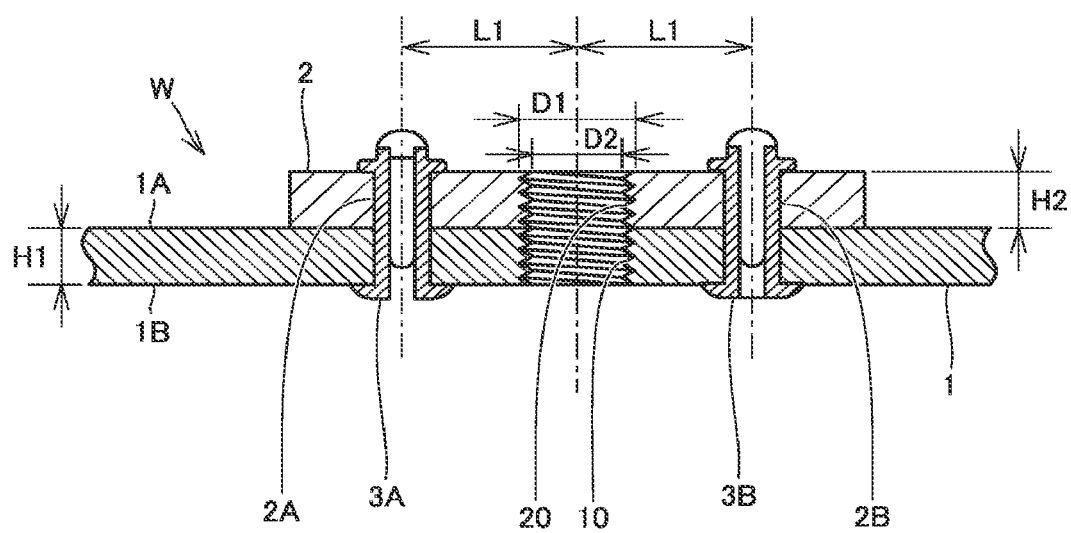
FIG. 2 is a schematic cross-sectional view along a line II-II in FIG. 1.

FIG. 1 is an external view of a workpiece to which a method for making a screw hole according to the present embodiment has been applied. FIG. 2 is a schematic cross-sectional view along a line II-II in FIG. 1.

Referring to FIG. 1, a workpiece W has a plate-shaped portion 1. Plate-shaped portion 1 forms at least a part of workpiece W. Plate-shaped portion 1 is a metal plate having a flat plate shape, and has a first surface 1A and a second surface 1B opposite to first surface 1A. Plate-shaped portion 1 is formed of a hot-dip galvanized steel plate, for example. Plate-shaped portion 1 has a thickness H1 of approximately 1.5 mm to 3 mm.

Workpiece W forms at least a part of a casing in which an electrical appliance is to be contained, for example. Second surface 1B of plate-shaped portion 1 may serve as an attachment surface to which the electrical appliance is attached. The electrical appliance can be held against and fastened to second surface 1B with a screw(s), to thereby fix the electrical appliance to second surface 1B.

An auxiliary member 2 is fixed to first surface 1A of plate-shaped portion 1. Auxiliary member 2 has a rectangular flat plate shape, and is smaller in plane area than plate-shaped portion 1.

As shown in FIG. 2, auxiliary member 2 is fixed to first surface 1A of plate-shaped portion 1 by means of fastening members 3A, 3B. As fastening members 3A, 3B, rivets can be used, for example. As fastening members 3A, 3B, countersunk screws may be used. When countersunk screws are used as fastening members 3A, 3B, the heads of the screws can be prevented from protruding from second surface 1B (attachment surface).

When rivets are used as fastening members 3A, 3B, through holes are formed in advance in each of plate-shaped portion 1 and auxiliary member 2.

As a method for fixing auxiliary member 2 to plate-shaped portion 1, a method that fastens auxiliary member 2 to plate-shaped portion 1 can be employed, or alternatively a method that bonds auxiliary member 2 to plate-shaped portion 1, a method that crimps and joins plate-shaped portion 1 and auxiliary member 2 together, or the like can be also be employed.

In plate-shaped portion 1 and auxiliary member 2, screw holes 10 and 20 are formed, respectively. Screw holes 10, 20 form an internal thread into which an external thread (not shown) is to be screwed. Each screw hole (internal thread) has crests and roots repeated at regular pitches. A diameter D1 of an imaginary cylinder connecting the roots of the internal thread is herein referred to as "major diameter" and a diameter D2 of an imaginary cylinder connecting the crests of the internal thread is herein also referred to as "minor diameter." Major diameter D1 of screw hole 10 is equal to major diameter D1 of screw hole 20, and minor diameter D2 of screw hole 10 is equal to minor diameter D2 of screw hole 20.

As shown in FIG. 2, in plate-shaped portion 1 and auxiliary member 2 fixed to plate-shaped portion 1, screw hole 10 is located concentrically with screw hole 20. As described later herein, screw hole 10 and screw hole 20 can be formed into a single screw hole by tapping auxiliary member 2 and plate-shaped portion 1 while keeping auxiliary member 2 fixed to plate-shaped portion 1.

A first portion 2A and a second portion 2B of auxiliary member 2 that are located with screw hole 20 in between are fastened to plate-shaped portion 1. Preferably, first portion 2A and second portion 2B are located symmetrically with respect to screw hole 20. In the example in FIG. 2, first portion 2A and second portion 2B are located at the same distance L1 from the center of screw hole 20.

Three or more portions of auxiliary member 2 may be fastened to plate-shaped portion 1. Preferably, the three or more portions fastened to plate-shaped portion 1 are also located at the same distance from the center of screw hole 20.

Figure 3:
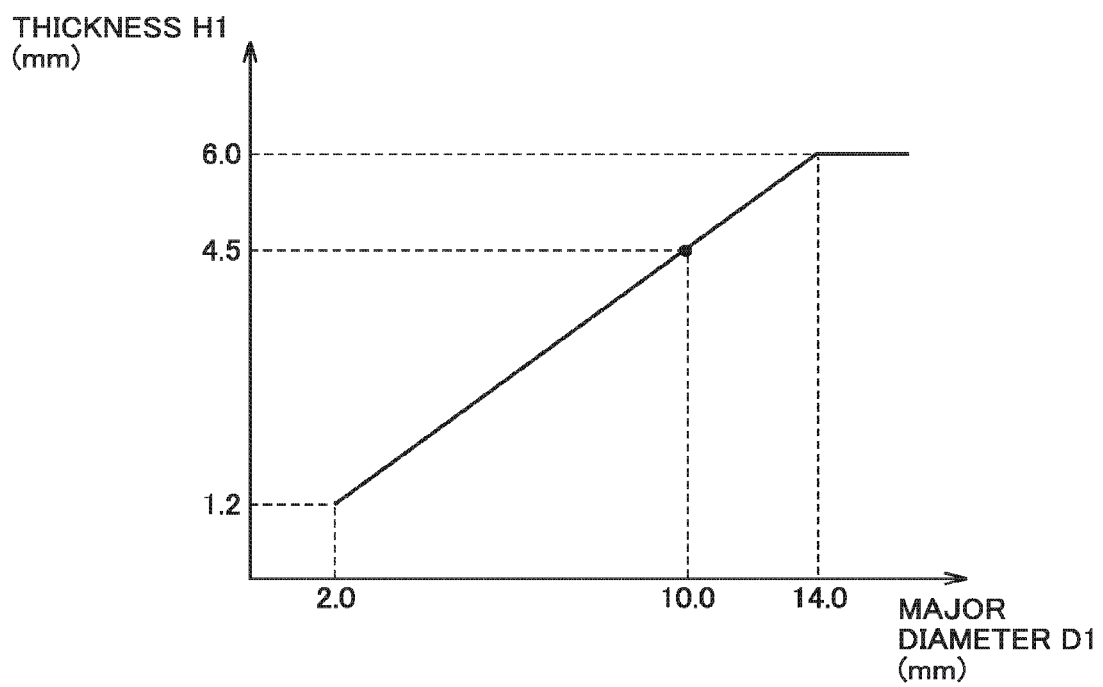
FIG. 3 shows a relation between the thickness of a plate-shaped portion of the workpiece and a major diameter of a screw hole that can be formed.

When a screw hole is formed in plate-shaped portion 1 of workpiece W, thickness H1 of plate-shaped portion 1 and major diameter D1 of a screw hole that can be formed therein have a relation as shown in FIG. 3. The vertical axis of FIG. 3 represents thickness H1 of plate-shaped portion 1 and the horizontal axis thereof represents major diameter D1 of the screw hole. FIG. 3 plots the upper limit of the major diameter of a screw hole that can be formed, relative to thickness H1 of a hot-dip galvanized steel plate. The relation shown in FIG. 3 can be prepared in advance through experiments conducted in advance on plate-shaped portion 1 of workpiece W.

In the example in FIG. 3, the upper limit of major diameter D1 of a screw hole that can be formed in plate-shaped portion 1 decreases with decrease of thickness H1 of plate-shaped portion 1.

When workpiece W is to form a housing of an electrical appliance, reduction of thickness H1 of plate-shaped portion 1 is required for the purpose of reducing the weight of the electrical appliance. For example, for plate-shaped portion 1 having a thickness H1 of approximately 2 to 3 mm, the upper limit of major diameter D1 of a screw hole that can be formed in this plate-shaped portion 1 is approximately 4 to 5 mm. A resulting problem is that an external thread screw that has a larger major diameter for the sake of ensuring an adequate strength for attaching the electrical appliance cannot be used.

In general, as a method for making a screw hole having a major diameter larger than the upper limit in a thin plate-shaped metal plate, a method that joins a weld nut to a metal plate by welding, or a method that crimps and attaches a nut to a metal plate is employed.

A concern about the method that uses a weld nut, however, is the requirement for an additional step of welding for joining the weld nut. In particular, for a metal plate formed of a galvanized steel plate, pore defects and/or sputter is caused during welding, resulting in a problem of degraded welding workability.

In the case of the method that crimps and attaches the nut, the nut may freewheel at a specified torque, depending on the state of attachment of the nut. In order to prevent freewheeling of the nut, the nut is required to be welded. Moreover, if the welded part is damaged, an additional plating is required for the damaged welded part, which is accompanied by a concern about an additional production step. Further, in the case of the method that crimps and attaches a nut to a metal plate, the crimped end of the nut protrudes from the surface of the metal plate, which may hinder attachment of an electrical appliance to the surface.

In view of the above, the present embodiment as shown in FIGS. 1 and 2 partially fixes flat plate-shaped auxiliary member 2 to a part of plate-shaped portion 1 in which screw hole 10 is to be formed, to thereby achieve the thickness that allows a screw hole having a desired major diameter to be formed.

In the following, a method for making a screw hole according to the present embodiment is described with reference to FIGS. 4 to 6.

Figure 4:
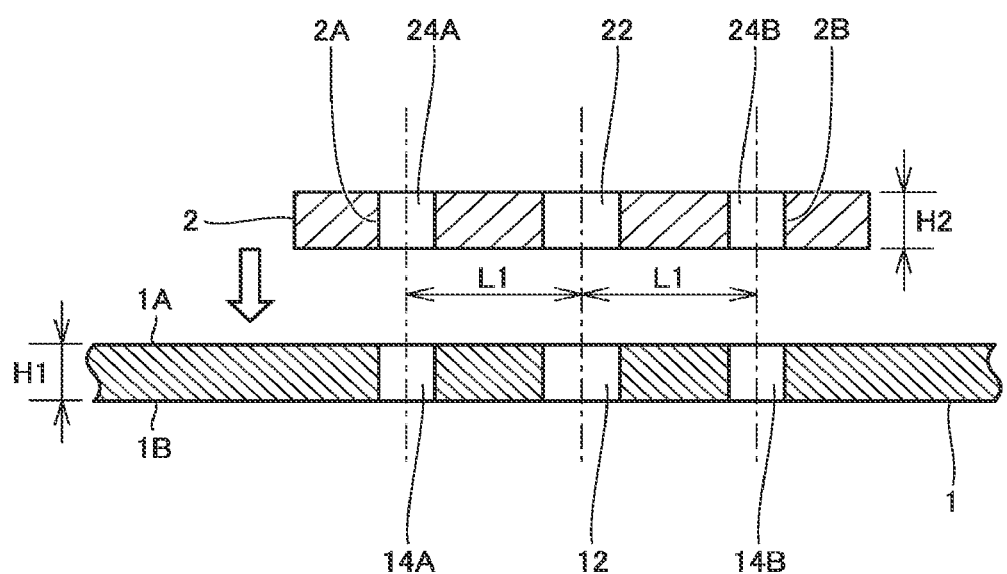
FIG. 4 illustrates a method for making a screw hole according to the present embodiment.

Referring to FIG. 4, initially workpiece W and auxiliary member 2 are prepared. In plate-shaped portion 1 of workpiece W, a pilot hole 12 is formed at the position where screw hole 10 is to be formed. In plate-shaped portion 1, through holes 14A, 14B are further formed for fastening auxiliary member 2. The minor diameter of pilot hole 12 is less than or equal to the minor diameter of screw hole 10.

In auxiliary member 2, a pilot hole 22 is formed at the position where screw hole 20 is to be formed. In auxiliary member 2, through holes 24A, 24B are further formed for fastening auxiliary member 2 to plate-shaped portion 1. The minor diameter of pilot hole 22 is less than or equal to the minor diameter of screw hole 20 (i.e., the minor diameter of screw hole 10).

Thickness H2 of auxiliary member 2 is determined based on the major diameter of screw hole 10 and thickness H1 of plate-shaped portion 1. Specifically, reference is made to the relation shown in FIG. 3 to determine a thickness H* of plate-shaped portion 1 required for forming a screw hole having a desired major diameter D1. For example, in order to form a screw hole 10 having a major diameter of 10 mm, a required thickness H* of plate-shaped portion 1 is approximately 4.5 mm. In view of this, thickness H2 of auxiliary member 2 is determined so that the sum (H1+H2) of thickness H1 of actual plate-shaped portion 1 and thickness H2 of auxiliary member 2 is more than or equal to the required thickness H* of plate-shaped portion 1. Specifically, thickness H2 of auxiliary member 2 is more than or equal to the difference (=H*−H1) determined by subtracting thickness H1 of actual plate-shaped portion 1 from required thickness H* of plate-shaped portion 1. For example, when screw hole 10 having major diameter D1=10 mm is to be formed in plate-shaped portion 1 having thickness H1=2.3 mm, thickness H2 of auxiliary member 2 is determined to satisfy H2≥2.2 mm.

As shown in FIG. 4, through holes 14A, 14B of plate-shaped portion 1 and through holes 24A, 24B of auxiliary member 2 are formed to overlap each other respectively when auxiliary member 2 is placed on first surface 1A of plate-shaped portion 1 with pilot hole 12 being located concentrically with pilot hole 22.

Figure 5:
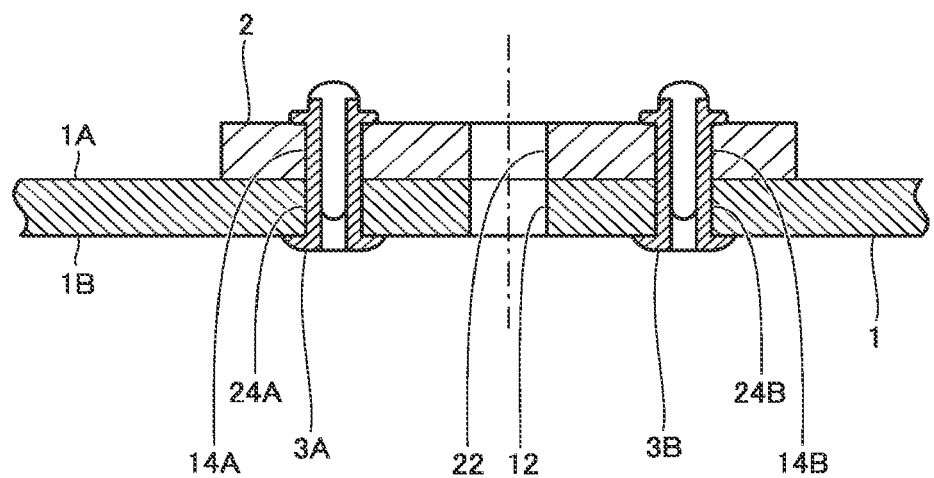
FIG. 5 illustrates the method for making a screw hole according to the present embodiment.

Referring next to FIG. 5, auxiliary member 2 is fixed to plate-shaped portion 1. In the example in FIG. 5, fastening members 3A, 3B are used to fasten auxiliary member 2 to plate-shaped portion 1. When rivets are used as fastening members 3A, 3B, a first rivet is inserted in through hole 14A and through hole 24A, a second rivet is inserted in through hole 14B and through hole 24B, and each of the first rivet and the second rivet is crimped to fasten auxiliary member 2 to plate-shaped portion 1.

When screws (not shown) are used as fastening members 3A, 3B, formation of the through holes can be dispensed with. When countersunk screws are used as fastening members 3A, 3B, countersunk holes are required to be formed in second surface 1B of plate-shaped portion 1 to receive respective heads of the countersunk screws.

Figure 6:
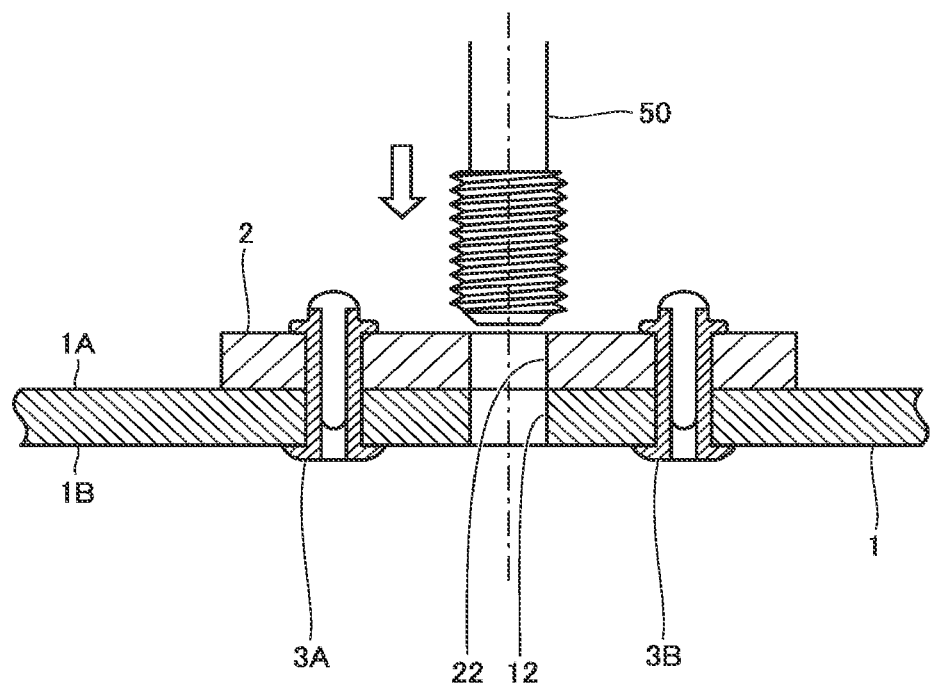
FIG. 6 illustrates the method for making a screw hole according to the present embodiment.

Referring next to FIG. 6, a tap 50 is inserted in pilot hole 12 and pilot hole 22 to tap the inner walls of pilot holes 12, 22. A well-known tool and well-known threading can be used as tap 50 and tapping, respectively. Accordingly, screw hole 10 and screw hole 20 as shown in FIG. 2 are formed in plate-shaped portion 1 and auxiliary member 2.

As seen from the foregoing description, the method for making a screw hole according to the present embodiment enables a screw hole to be formed in a plate-shaped portion of a workpiece, without using welding. Accordingly, a screw hole can be formed easily even in a plate-shaped portion formed of a material that is difficult to weld. Moreover, because attachment of a nut is unnecessary, freewheeling of the nut can be avoided.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 plate-shaped portion; 2 auxiliary member; 3A, 3B fastening member; 10, 20 screw hole; 12, 22 pilot hole; 14A, 14B, 24A, 24B through hole; 50 tap; W workpiece

The invention claimed is:

1. A method for making a screw hole in a workpiece having a plate-shaped portion, the method comprising:
preparing an auxiliary member having a flat plate shape;
forming, in the plate-shaped portion, a first pilot hole having a minor diameter smaller than a major diameter of the screw hole;
forming, in the auxiliary member, a second pilot hole having a minor diameter smaller than the major diameter of the screw hole;
fixing the auxiliary member to the plate-shaped portion so that the first pilot hole is concentric with the second pilot hole; and
making the screw hole in the plate-shaped portion and the auxiliary member by inserting a tap in the first pilot hole and the second pilot hole,
wherein preparing the auxiliary member includes:
determining a total thickness of the plate-shaped portion and the auxiliary member based on the major diameter of the screw hole; and
preparing the auxiliary member having a thickness equal to a difference between the total thickness and a thickness of the plate-shaped portion.

2. The method for making a screw hole according to claim 1, wherein fixing the auxiliary member includes fastening, to the plate-shaped portion, a first portion and a second portion of the auxiliary member that are arranged so that the first pilot hole and the second pilot hole are located between the first portion and the second portion.

3. The method for making a screw hole according to claim 2, wherein fastening the first portion and the second portion of the auxiliary member includes arranging the first portion symmetrically with the second portion with respect to the second pilot hole.

4. The method for making a screw hole according to claim 3, wherein fastening the first portion and the second portion of the auxiliary member includes fastening the auxiliary member to the plate-shaped portion using a rivet.

5. The method for making a screw hole according to claim 2, wherein fastening the first portion and the second portion of the auxiliary member includes fastening the auxiliary member to the plate-shaped portion using a rivet.

6. The method for making a screw hole according to claim 1, wherein fixing the auxiliary member includes fastening, to the plate-shaped portion, a first portion and a second portion of the auxiliary member that are arranged so that the first pilot hole and the second pilot hole are located between the first portion and the second portion.

7. The method for making a screw hole according to claim 6, wherein fastening the first portion and the second portion of the auxiliary member includes arranging the first portion symmetrically with the second portion with respect to the second pilot hole.

8. The method for making a screw hole according to claim 7, wherein fastening the first portion and the second portion of the auxiliary member includes fastening the auxiliary member to the plate-shaped portion using a rivet.

9. The method for making a screw hole according to claim 6, wherein fastening the first portion and the second portion of the auxiliary member includes fastening the auxiliary member to the plate-shaped portion using a rivet.

* * * * *